No. 704,776. Patented July 15, 1902.
E. A. BOOSER.
CAR FENDER.
(Application filed Feb. 10, 1902.)
(No Model.) 2 Sheets—Sheet 1.
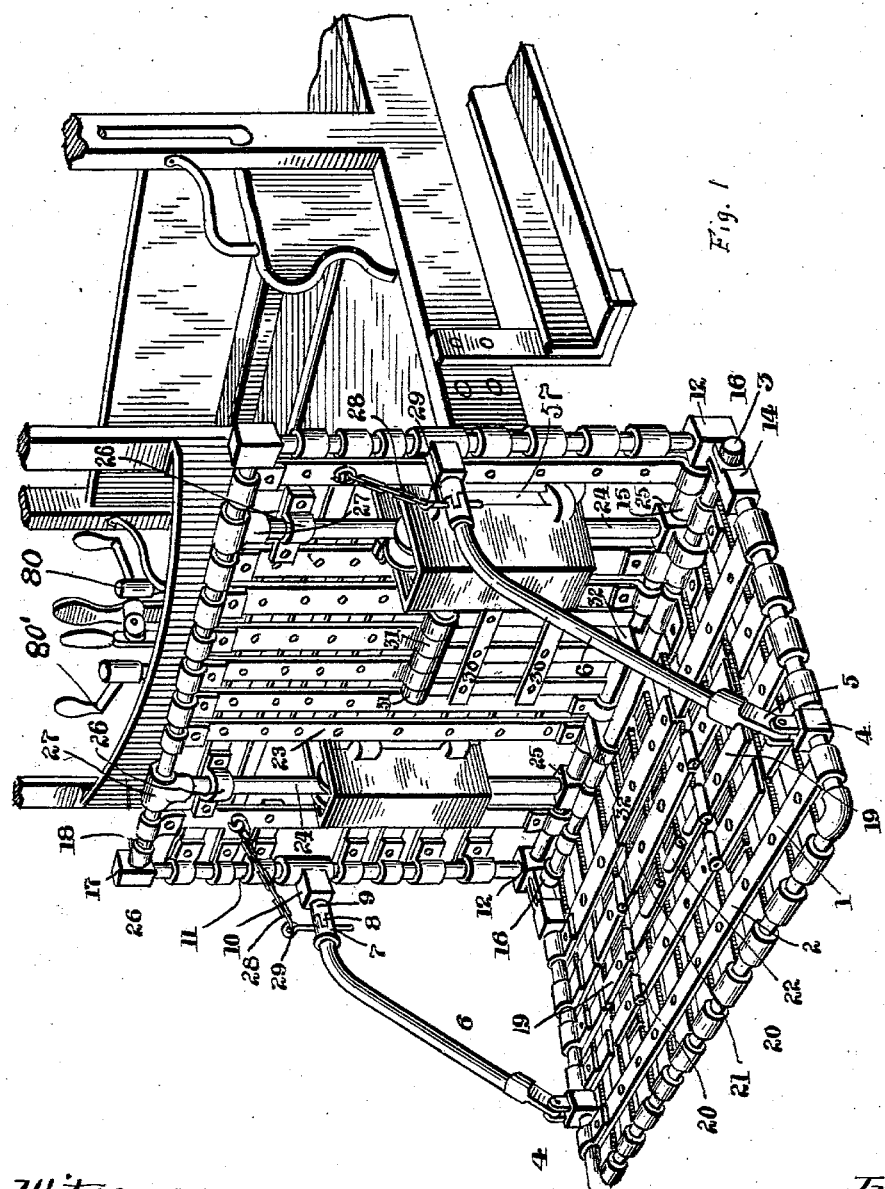
Witnesses:
Inventor,
E. A. Booser.
By
Attorneys No. 704,776. Patented July 15, 1902.
E. A. BOOSER.
CAR FENDER.
(Application filed Feb. 10, 1902.)
(No Model.) 2 Sheets—Sheet 2.
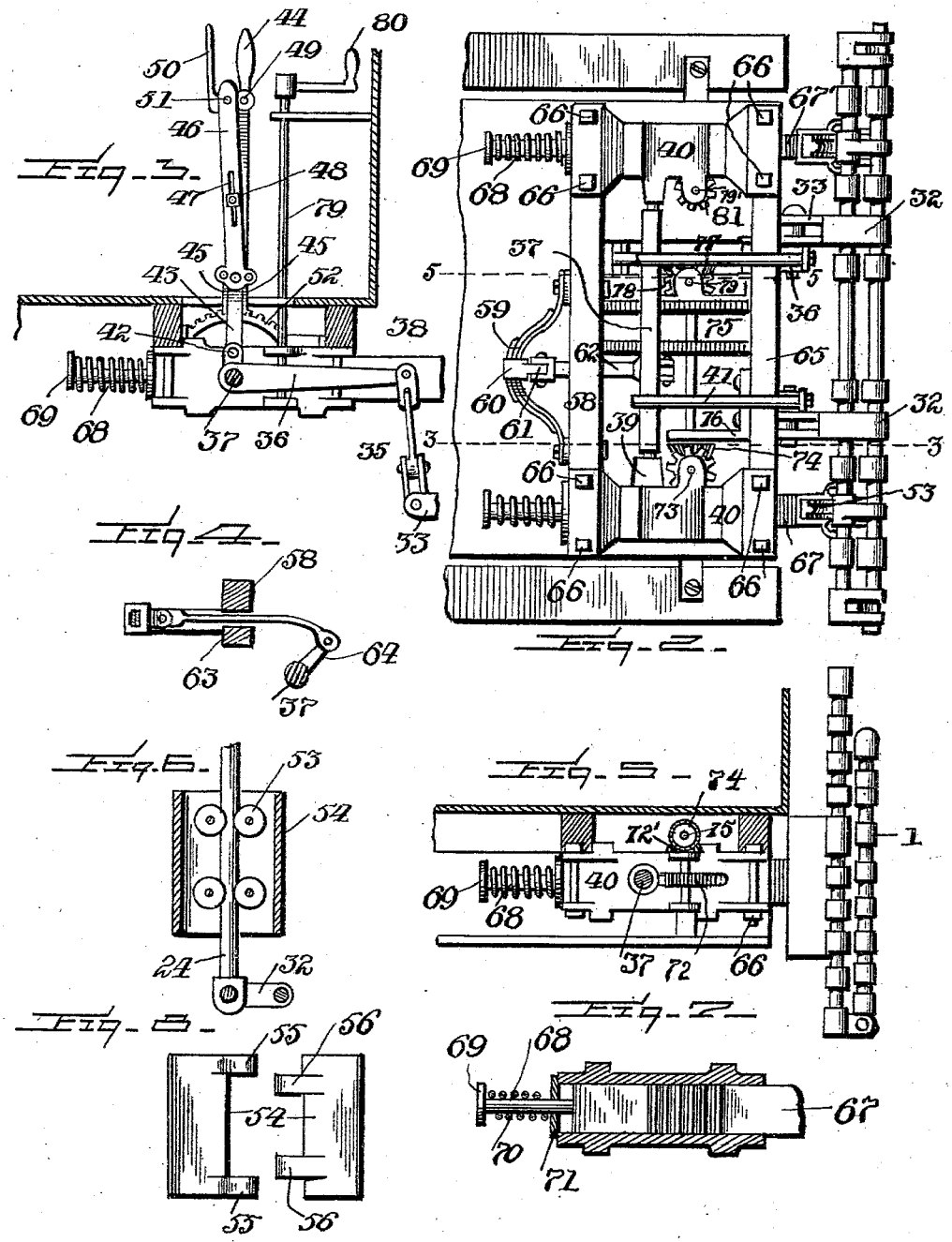
Witnesses:
Inventor.
E. A. Booser.
By
Attorneys.

UNITED STATES PATENT OFFICE.

ELI A. BOOSER, OF ALTOONA, PENNSYLVANIA.

CAR-FENDER.

SPECIFICATION forming part of Letters Patent No. 704,776, dated July 15, 1902.

Application filed February 10, 1902. Serial No. 93,349. (No model.)

*To all whom it may concern:*

Be it known that I, ELI A. BOOSER, a citizen of the United States of America, residing at Altoona, in the county of Blair and State of Pennsylvania, have invented certain new and useful Improvements in Car-Fenders, of which the following is a specification, reference being had therein to the accompanying drawings.
This invention relates to certain new and useful improvements in car-fenders, and relates more particularly to life-saving car-fenders that are attached to the front of street-railway cars.
The object of the present invention is to provide a fender that may be easily raised and lowered from the platform of the car to any desired height; furthermore, to provide means that will allow the fender to be compactly folded against the dashboard or front of the car, providing means to allow both the buffers and bumpers to extend through the body of the car-fender when in a folded position.
It is a well-known fact that when the car is traversing curves, particularly sharp curves, the fender does not follow the line of travel of the car, but extends outwardly therefrom, and in many instances when traveling abrupt curves the fender will extend over the sidewalk and allow a greater portion of the space between the rails unprotected. It is the object of my present invention to overcome all such difficulties and to provide a fender that when properly operated by the motorman or gripman will follow the path of travel around curves. Therefore I provide novel means and mechanism to adjust the fender to an angle to conform with the tangent of the arc or curve over which the car traverses in order that the fender at all times will effectually guard the space between the tracks whether traveling upon a straight line or passing around a curve or loop. In order to accomplish this desired result effectually, I have provided novel means to angularly adjust the fender in relation to the forward end of the car, said angular adjustment admitting the fender to be shifted either to the right or left hand side, as the case may be.

My present invention further contemplates to provide novel means that will effectually retain the fender in a folded position. Said fender when in said position will protect the same and will prevent any injury when the cars are placed in the shed or when a number of cars are coupled together, as is the case when trailer-cars are used or a number of cars coupled together to form a train.

My invention has for its further object to provide a fender of this character that will be extremely simple in construction, strong, durable, comparatively inexpensive to manufacture, and highly efficient in its operation.

With the above and other objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate like parts throughout the several views, in which—

Figure 1 is a perspective view of my improved car-fender, showing the same in position when in use. Fig. 2 is an under plan view thereof, showing the fender in a folded position. Fig. 3 is a longitudinal vertical sectional view taken on the line 3 3 of Fig. 2, showing the parts in an upright position. Fig. 4 is a detail sectional view of the connection of the rear springs attached to the cross-beam. Fig. 5 is a longitudinal sectional view on the line 5 5 of Fig. 2, showing the fender in a folded position. Fig. 6 is a vertical sectional view of one of the casings, showing the roller-bearings and rod. Fig. 7 is a vertical sectional view taken on the line 7 7 of Fig. 2, showing the buffers and buffer-springs. Fig. 8 is a side elevation of the two sections of the casing, as illustrated in Fig. 6.

In the drawings the reference-numeral 1 represents the lower frame of the fender, which is formed of transversely-extending strips 2, said frame 1 being hinged to a stationary shaft 3. The sides of the frame 1 carry upwardly-extending apertured lugs 4, in which are pivotally secured contracted ends 5 of the braces 6, the upper end of said braces being bifurcated, as shown at 7, and have formed therein an aperture, the said apertured ends 7 engaging the contracted portion 8 of the studs 9, carried by the brackets 10, which are sleeved upon the standards 11. These standards 11 are secured at their lower ends in sockets 12, carrying apertured lugs 14, in which the stationary shaft 3 is secured. Extending transversely across the fender and secured to the inner faces of the sockets 12 is arranged a shaft 15, a hinged connection 16 being formed between the lower frame 1 and the shaft 3. At the upper end of the standards 11 are secured sockets 17 to receive the upper shaft 18, the standards 11 and shafts 15 and 18 forming the framework for the upright section of the fender. In the transversely-extending strips 2, forming the lattice between the frame 1, are formed doors 19 19, these doors being hinged at 20 20 and fold inwardly. The reference-numeral 21 represents a central door which is hinged at 22 and folds forwardly. The upright extending frame is also formed of strips forming the lattice 23 and carries two vertical shafts 24, the latter being secured in sockets 25 at their lower ends, connected to the shaft 15, and at their upper ends these vertical shafts 24 extend through keepers 26 and are rigidly secured at their upper extensions in sleeves 27, which encircle the shaft 18. Upon the front face of the lattice 23, near the sides thereof, are secured chains 28, carrying at their ends coupling-pins 29, which extend through the bifurcated apertured ends 7 and also extend through registering apertures formed in the contracted portion 8 of the lugs 9, which serve to couple the lower section of the fender to the upright section. A central door 30 is formed in the lattice 23, which is hinged at 31 and swings upwardly. The shafts 3 and 15 are secured to arms 32, which are bifurcated, as shown at 33, carrying a compound joint 34, connected to an arm 35, secured to the lever-arm 36, carried by the shaft 37. This arm 35 also carries a compound joint 38 at its upper end of a construction similar to that of the compound joint 34. A shaft 37 is pivotally secured at its ends in outwardly-extending lugs 39, carried by the bearing-blocks 40. This shaft 37 also carries a lever 41, connected to the other of the arms 32 by means of a similar construction such as disclosed by the compound joints 38 and 33 and arm 35. Extending upwardly from the shaft 37 is a bifurcated lug 42, receiving the lower end of the arm 43, to which they are rigidly attached, said arm carrying a handle 44 at its upper end. Slidingly mounted upon this arm 43 is a pair of plates 45, secured at their upper ends to the lower end of the operating-arm 46, the latter having a slot 47 therein, in which operates the guide-bolt 48, carried by the arm 43. At the upper end of the arm 43 a lever 49 is pivotally secured thereto and carries an upwardly-extending operating-arm 50, the upper end of the arm 46 being pivotally secured to this lever 49, as shown at 51. The plates 45 operate in a rack-bar 52 and may be readily disengaged therefrom by pressing the operating-handle 50 toward the operating-handle 44 of the arm 43, which will cause the arm 46 to ride on the bolt 48, and thereby lift the plates 45 from engagement with the teeth of the rack-bar 52 and permit a lateral movement of the arm 43.

The invention aims to provide a fender which may have a vertical movement, and to this end vertical shafts 24 are guided by means of guide-rollers 53, diametrically mounted with relation to the shaft 44 within the casing 54. This casing comprises two members carrying lugs 55 56, adapted for engagement with each other, the lugs being perforated, and receive the rods 57, whereby the several sections are held in their respective positions. It will thus be seen that by lifting the plates 45 from out of engagement with the rack 52 the arm 43 may be swung in a rearward direction, which will cause the lever 36 to move in a vertical direction, communicating motion to the arm 35 and from thence to the arm 32, which will cause the fender to move upwardly. The reverse movement of the arm 43 will likewise cause the fender to assume its normal position. To the cross-beam 58 is secured the bowed band-springs 59, which are inclosed within a lug 60, having a contracted end 61, secured between the bifurcations of the lever 62, the latter extending through the cross-beam in the slot 63 provided therefor, and from thence extending downwardly and receiving the arm 64, carried by the transversely-running shaft 37. Thus when the fender has been actuated to assume a certain position the springs 59 will tend to return the same to its normal position after the plates 45 have been released from engagement with the teeth of the rack-bar 52. At each side of the forward end of the car and to the cross-beam 58 and cross-bar 65 are secured bearings 40 by means of bolts 66 or any other suitable means. Formed integral with the rear end of the casings 54 are arms 67, substantially square in cross-section, these arms extending rearwardly through the bearings 40 and carrying the contracted shank 68, the latter carrying a washer 69 to limit the movement of the spiral spring 70, mounted upon the shank 68. At the rear end of the bearing-blocks a cap 71, apertured to enable the shank 68 to pass therethrough, is mounted and is engaged by the forward end of the spiral spring 70. The inner sides of these arms 67 are suitably toothed and are adapted to be engaged by the operating cog-wheel 72, suitably mounted between the outwardly-extending lugs 73, carried by the bearings 40. Mounted above this cog-wheel 72 is a bevel gear-wheel 72', which meshes with a like wheel 74, carried by the transversely-extending shaft 75. The latter has its one end secured to the right-angular bracket 76, the one side of which is bolted onto the cross-beam 65. At its other end this shaft 75 carries a bevel gear-wheel 77, meshing with the gear-wheel 78, carried by the operating-rod 79, carrying the crank 80 at its upper end. The other of these arms 67 has a direct connection with an operating-rod 79', carrying crank 80'—that is, the lower end of the operating-rod carries a toothed wheel 81, which extends through the bearings 40 and meshes with the toothed rack formed on the arm 67. Thus when it is desired to cause the fender to follow the car when the latter is traversing a curve it is simply necessary for the motorman or gripman to operate either of the operating-handles to cause the fender to extend outwardly from either the left or right hand side of the car, according to the direction in which the latter is moving. It will be noted that the two operating-handles, together with the operating means for causing the fender to assume the vertical position, are all located in a comparatively small sphere.

It is not thought that a further detail description will be necessary in view of the above, and it will be also noted that various changes may be made in the details of construction and combination of parts without departing from the general spirit and scope of my invention.

Having fully described my invention, what I claim as new, and desire to secure by Letters Patent, is—

1. In a car-fender, the combination with the car, of a fender comprising a lower frame and a vertical frame, a series of hinged doors carried by said frames, vertical shafts carried by the vertical frame, bearings carried by the bottom of the car, means for operating the fender in a vertical direction, means carried by the vertical frame and extending into the bearings, and means for operating said means whereby one or both sides of the fender may be extended outwardly, substantially as described.

2. In a car-fender, the combination with a car, of a vertical and a lower frame carried thereby, means for raising said fender in a vertical direction, means for returning said fender to its normal vertical position, and means secured to each side of the vertical frame for causing the same to move outwardly, substantially as described.

3. In a car-fender, the combination with a vertical frame and a lower frame pivotally mounted thereon, a rack-bar carried by said vertical frame, bearings carried by the bottom of the car and in which said rack-bars operate, said rack-bars being spring-pressed, and means for operating said rack-bars to cause the fender to move outwardly from the car, substantially as described.

4. In a car-fender, the combination with a car, of a fender comprising a vertical frame having a lower frame pivotally mounted thereon, a series of hinged doors carried by the said members of the fender, a spring-pressed connection formed between the said fender and the under face of the car, and means for operating said connection whereby the fender may be operated in a vertical direction, substantially as described.

5. In a car-fender, the combination with a car having a fender comprising a lower and a vertical frame secured thereto, of casings having guide-rollers mounted therein, a vertical frame carrying vertical shafts operating between said guide-rollers, the lower end of the vertical frame having rearwardly-extending spring-pressed rack-bars connected thereto, said rack-bars operating in bearings carried by the bottom of the car, and means for operating said rack-bars whereby the fender is moved in the outward position, substantially as described.

6. In a car-fender, the combination with a car having a vertical frame and a lower frame connected thereto, of casings having guide-rollers mounted therein connected to the vertical frame, hinged doors carried by the lower frame whereby the same may be swung backwardly to receive the said casings when the fender is in a folded position, a spring-pressed connection between the fender and the bottom of the car, means for operating said connection so as to cause the fender to move in a vertical direction, and means for actuating the fender in an outward direction from either one or both sides thereof, substantially as described.

In testimony whereof I affix my signature in the presence of two witnesses.

ELI A. BOOSER.

Witnesses:
  C. W. BOOSER,
  A. W. BOOSER.